United States Patent [19]

Passarotto

[11] Patent Number: 5,144,108
[45] Date of Patent: Sep. 1, 1992

[54] KILN FOR PRODUCING LITHARGE BY MEANS OF THE CALCINATION OF MASSICOT

[75] Inventor: Roberto Passarotto, Brugherio, Italy

[73] Assignee: Minemet Italia S.p.A., Milan, Italy

[21] Appl. No.: 544,691

[22] Filed: Jun. 27, 1990

[30] Foreign Application Priority Data

Jul. 5, 1989 [IT] Italy ................... 21104 A/89

[51] Int. Cl.⁵ .............................................. H05B 6/64
[52] U.S. Cl. .............................. 219/10.71; 219/10.49;
219/10.69; 219/388; 219/389; 219/390;
219/10.67; 34/179; 34/183; 432/98; 432/139;
373/138; 373/164
[58] Field of Search ............... 219/10.71, 10.69, 10.49,
219/388, 389, 10.67, 10.73, 10.65, 10.51, 10.41,
10.43, 390; 34/179, 180, 183; 432/98, 82, 139,
138, 154, 239; 373/22, 116, 114, 138, 164

[56] References Cited

U.S. PATENT DOCUMENTS

| | | | |
|---|---|---|---|
| 1,538,365 | 5/1925 | Willson | 219/10.71 |
| 3,961,150 | 6/1976 | Lewis et al. | 219/10.49 |
| 4,039,794 | 8/1977 | Kasper | 219/10.49 |
| 4,510,363 | 4/1985 | Reynolds | 219/10.71 |
| 4,574,182 | 3/1986 | Pescatore et al. | 219/388 |
| 4,797,524 | 1/1989 | Moret et al. | 219/10.69 |
| 4,912,301 | 3/1990 | McKinney et al. | 219/388 |

Primary Examiner—Bruce A. Reynolds
Assistant Examiner—Tu Hoang
Attorney, Agent, or Firm—Hedman, Gibson & Costigan

[57] ABSTRACT

The kiln (1) for producing litharge has a thermally insulated tubular body (2) containing, throughout its length, a shaft (30) with paddles acting as an auger. The tubular body (2) is coaxial with an induction coil (11), which heats it. The raw material in powder form (i.e., the massicot) is charged at a first head (9) of the tubular body (2) and is moved forwards by the paddle shaft (30), until it reaches the second head (10), opposite to the first one (9). During the translation the material (massicot) is heated and is oxidated, being converted into litharge.

17 Claims, 3 Drawing Sheets

000
KILN FOR PRODUCING LITHARGE BY MEANS OF THE CALCINATION OF MASSICOT

FIELD OF THE INVENTION

The present invention is concerned with a calcination kiln, in particular for producing litharge by means of the calcination of massicot.

BACKGROUND OF THE INVENTION

Litharge, which is a chemical product whose formula is PbO, is used in several industrial sectors and one among the most common methods for producing it is the one which resorts to the calcination of massicot, which is a mixture of lead oxide and metal lead and has the chemical formula $PbO + Pb$.

The presently used kilns comprise a plurality of tubes, lapped by the flue gases generated by the combustion, e.g., of methane gas, and so connected as to run along an essentially "S"-shaped trajectory.

Massicot, charged to an end of the "S"-shaped path leaves it (after being heated and oxidated), transformed into litharge, at the opposite end.

The movement of advancement of the material takes place in countercurrent to the flue gases generated by combustion.

The kilns known from the prior art show several drawbacks, the main of which are briefly described in the following.

(a) only a portion of the kiln, and more precisely about half thereof, is active as regards the conversion of massicot into litharge; the residual portion of the kiln performs the function of recovering the thermal energy produced by the kiln, by pre-heating massicot, which will be subsequently transformed into litharge. As a consequence, the dimensions of the kiln are very large relatively to its throughput.

(b) Owing to its large dimensions, the kiln reaches its steady-state operating temperature with poor precision in the various regions; in fact, the value of temperature inside the kiln is influenced by many factors interacting with one another, such as, e.g., the temperature of the combustion chamber, of the burner, the flow rate of the air stream injected into the kiln, and the heat dispersions. Controlling such factors becomes more and more difficult as the dimensions of the kiln increase.

(c) The need for providing at least one combustion chamber and for reducing energy consumption by recovering a portion of the generated heat by pre-heating massicot, causes a further increase in kiln dimensions.

(d) The large surface-area of the external surfaces of the combustion chamber cause considerably heat losses towards the external environment, to which the heat losses causes by the stack add up.

(e) The products of the combustion submit the tubes lapped by the flue gases to considerable stresses of chemical and thermal nature, with frequent interventions for inspection and maintenance being necessary.

(f) Also the lining structure of refractory bricks directly invested by the flames and/or highly corrosive gases, generated by the combustion, requires frequent interventions for inspection and maintenance.

(g) The possible perforation of, or formation of crevices in, one or more tubes, causes the coming of the product contained in the tube into direct contact with the flame, with the consequent dispersion of lead oxide into the surrounding environment, through the stack, with evident ecological damages.

SUMMARY OF THE INVENTION

The purpose of the present invention is of simultaneously obviating all of the above reminded drawbacks.

Such purposes are achieved by a kiln for producing litharge by means of the calcination of massicot advancing inside the interior of the same kiln under the action of screw conveyor means, which comprises one single tubular structure destined to contain massicot advancing between a first end and a second end, means for charging massicot installed at the first end of the tubular structure, heating means operating on the basis of the principle of electromagnetic induction, acting along the length of the tubular structure, means for injecting the massicot oxidating gas, and means for discharging massicot transformed into litharge, installed at the second end of the tubular structure.

BRIEF DESCRIPTION OF THE DRAWINGS

The invention is illustrated for merely exemplifying, non-limitative purposes, in the schematic figures of the hereto attached drawing tables, wherein.

DETAILED DESCRIPTION OF THE PREFERRED EMBODIMENT

Figure 1:
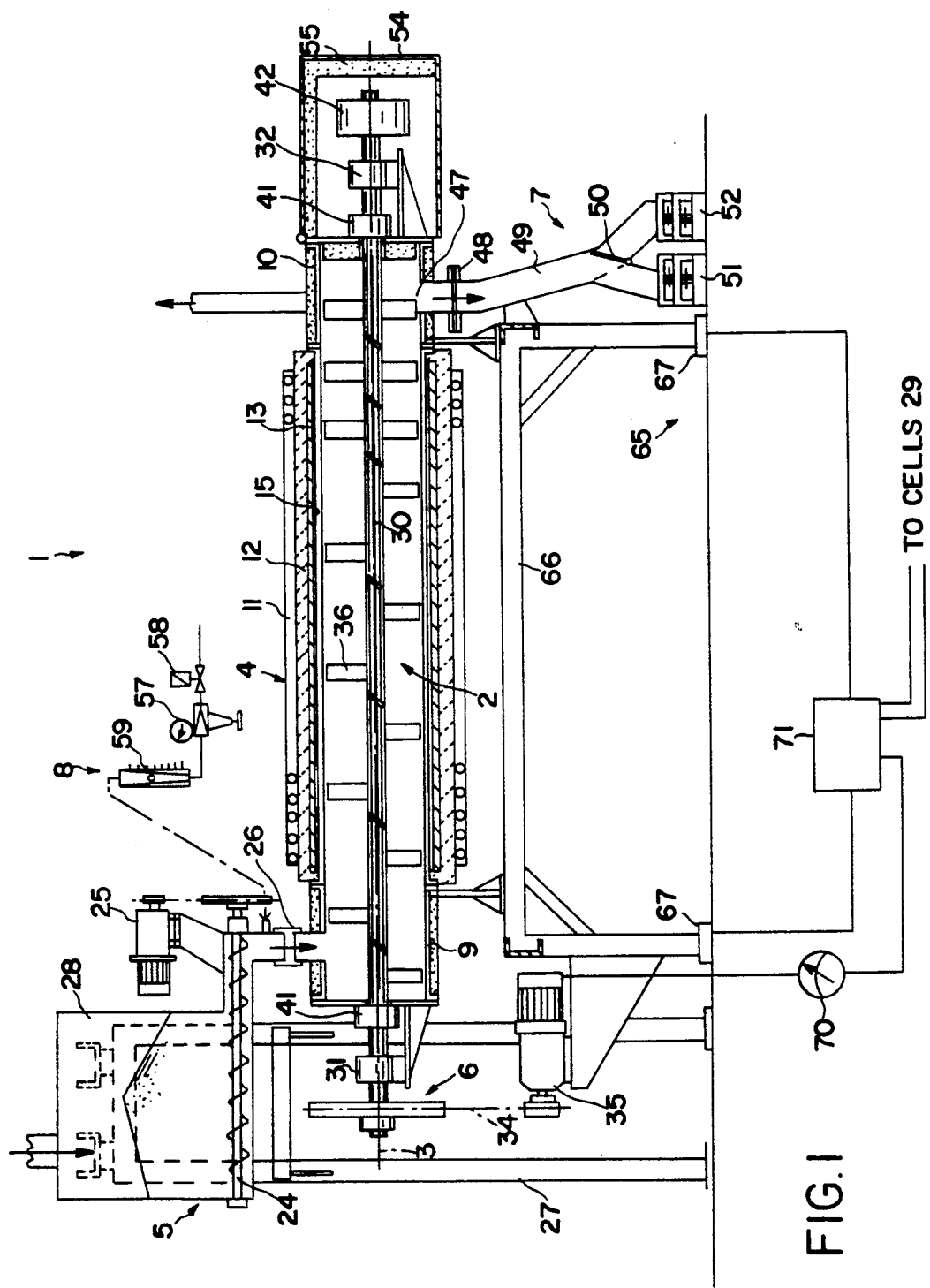
FIG. 1 shows a sectional side view of the kiln according to the present invention.
Figure 2:
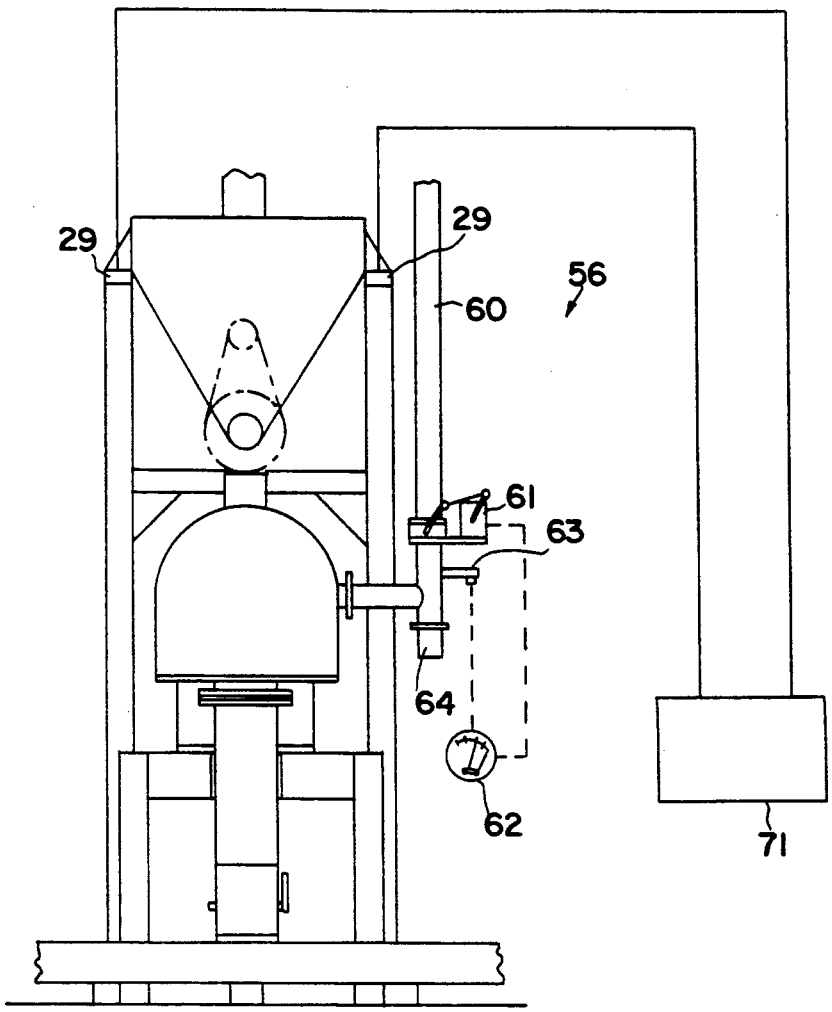
FIG. 2 shows a front view of the kiln.
Figure 3:
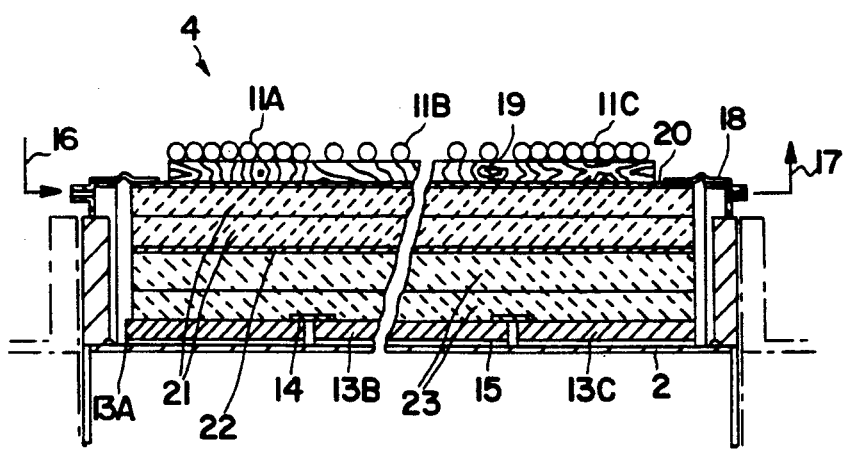
FIG. 3 shows a sectional view of the heating unit.

Referring to the above figures, the kiln according to the present invention, generally indicated with the reference numeral 1, is destined in particular to the production of litharge by massicot calcination.

The kiln essentially comprises one single tubular body 2 with major axis 3 (i.e., "the axis of the kiln"), a heating unit 4, means 5 for feeding the raw material to the kiln, means 6 of screw conveyor type for translating the processed material inside the interior of the tubular body, means 7 for discharging the material, means 8 for feeding the oxidating air and means 56 for controlling the depressure inside the kiln.

The kiln 1 can be additionally equipped with means 65 for weighing it, which are essential for it to correctly operate.

The tubular body 2 comprises a stainless-steel tube provided with a first head 9 and a second head 10. Said first and second heads are thermally insulated and are respectively associated with the means 5 for feeding the material to the kiln and with the means 7 for discharging the treated material from the kiln.

The tubular body 2 is coaxially contained inside the heating unit 4, which comprises, listed from outside inwards, an induction coil 11, a layer of insulating refractory material 12 and a tube of ferromagnetic material 13.

The induction coil 11 is constituted by a plurality of elements; in the herein illustrated case, the induction coil is constituted by three elements 11A, 11B and 11C, having different numbers of turns and hence capable of offering different heating powers, Also the tube of ferromagnetic material 13 is constituted by a plurality of sections 13A, 13B and 13C, linked by joints 14.

The coil elements 11A, 11B and 11C heat, by induction, the respective sections 13A, 13B and 13C which in their turn transmit heat to the tubular body 2, which is made from an inoxidizable material in order to be capable of withstanding the aggressivity of the material in course of transformation inside its interior.

In order to prevent the corrosion of the tube 13 and, obviously, of the sections 13A, 13B and 13C which compose it, between said tube 13 and the tubular body 2 an air space 15 is provided, inside which an inert gas, such as, e.g., nitrogen, is injected. For that purpose, a nitrogen feed hose 16 and a nitrogen discharge hose 17 are respectively provided at both ends of the heating unit and in correspondence of sealing means comprising a sealing band of fiberglass-reinforced silicone resin. In that way, nitrogen can be renewed whenever necessary.

The layer of insulating refractory material 12 comprises, listed from outside inwards, spacer beams 19, a coating 20 of fiberglass-reinforced polyester resin, a plurality of layers 21 of a material known on the market under the trade name "Microterm" (in the herein exemplified case two of such layers are provided), a wrapping made from a fiberglass or asbestos 22 ribbon, a plurality of layers or ceramic fiber 23 (in the herein exemplified case two of such layers are provided). "Microterm" is obtained by filling bags of fiberglass cloth with titanium and zirconium oxides, and is endowed with high characteristics of heat insulation.

The use of "Microterm" as the heat-insulating material, rather than other materials, made it possible, thanks to the high-level characteristics of this material, the thickness of the layer of insulating refractory material 12 to be considerably reduced, thus facilitating the realization of the induction coil 22.

The means 5 for feeding the raw material to the kiln comprise a feed hopper 28, a metering screw feeder 24 driven by a relevant ration motor 25, and a support structure 27. The metering screw feeder draws the material from the bottom of the hopper 28 and discharges it directly to the first head 9 which is purposely provided with a flexible coupling 26.

Between the support structure 27 and the feed hopper 28 load cells 29 are installed, which detect the weight of the hopper 28. The detected data is sent to a circuit which determines the decrease in the weight of the metering screw feeder during the unit time, compares the decrease to the optimum preset feed rate and then, if necessary, corrects the revolution speed of the auger of the metering screw feeder 24 by acting on the ration motor 25 such as to adjust if necessary the raw material feed rate back within the preset range for its values.

The conveyor screw means 24 for translating the material inside the tubular body 6 substantially comprise a shaft 30 with paddles, the axis of which shaft is the same as the major axis 3 of the kiln, a chain transmission 34 and a relevant motor 35. The paddles 36 installed on the shaft 30 are so arranged as to form a simple screw or auger in the region closest to the first head 9 and in the intermediate region between the first head 9 and the second head 10, whilst in the region closest to the second head 10, the screw or auger formed by the paddles 36 is a double one.

The shaft 30 is respectively supported at its first and second ends respectively by a first bearing 31 and a second bearing 32; such bearings can be shifted perpendicularly to the axis 3 of the kiln.

Figure 5:
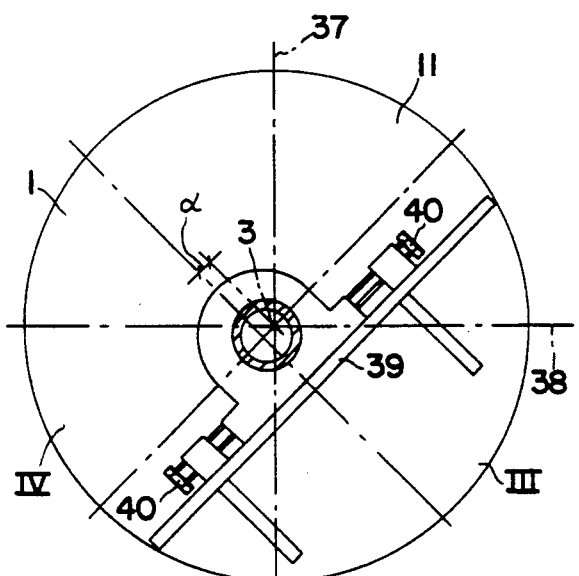
FIG. 5 shows a view of the means for shifting the shaft with the paddles.
Figure 6:
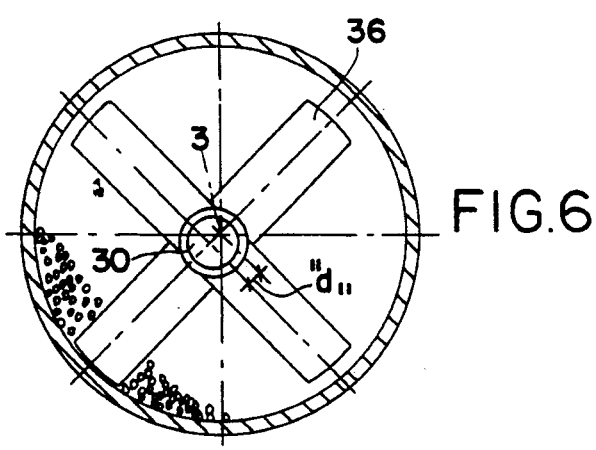
FIG. 6 shows a view of the out-of-alignment position of the shaft with paddles, relatively to the tubular structure of the kiln which contains it.

Referring in particular to FIGS. 5 and 6, the axis 3 can be regarded as defined by the intersection of a vertical plane 37 with a horizontal plane 38.

Such planes define a first, a second, a third and a fourth sector of the kiln 1. A suitable guide plane 39 and screw adjusting means 40 make it possible the distance "d" between the axis of the kiln and the axis of the shaft 30 with paddles to be adjusted, so that the shaft 30 can be placed, owing to an oblique shift, in the second, or in the fourth sector of the kiln. In fact, experience has demonstrated that an accumulation of the handled material usually occurs in the fourth sector, and therefore the possibility of displacing the shaft 30 and arranging in the fourth sector makes it possible such a material to be removed.

In order to make it possible to remove the material without moving the shaft to an out-of-alignment position, it is not possible to think of simply dimensioning the height of the paddles 36 in such a way that the paddles will skim all of the internal surface of the tubular body 2, running with their ends as close as possible to the internal surface, because if the tubular body 2 bends and undergoes mechanical and thermal stresses deriving from the material to be processed, it would cause the seizure of the screw conveyor which conveys the material inside the kiln. In practice, the upper end of some paddles would seize against the internal surface of the tubular body 2. Any anomalies in kiln operation can be anyway detected as soon as they arise, e.g., by measuring the current absorbed by the motor 35 and using such a value as an index of risk of seizure of the conveyor screw means 6. The shaft 30 is associated with stuffing boxes 41 lubricated with a high-temperature grease in order to prevent the material contained inside the tubular body 2, which material is highly pollutant, to escape to the surrounding environment.

Owing to the nature of the material to be processed, and to the structure of the shaft 30 with paddles, it frequently occurs that the material adheres to an exceptionally high extent to the same shaft 30, overcharging it.

Figure 4:
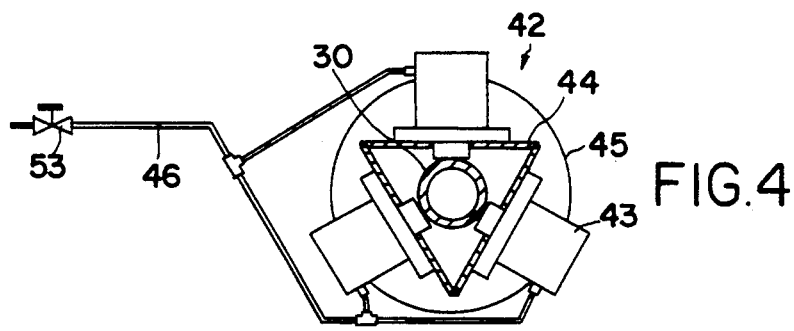
FIG. 4 shows a view of the beating device applied to the shaft of the kiln.

In order to prevent any undesired accumulations of material, beating means 42 have been provided and (see FIG. 4) installed, e.g., at the second end of the shaft 30.

The beating means 42 comprise a plurality of hammers 43, e.g., of pneumatic type, positioned so that the blow applied by each hammer with respect to the shaft 30 is compensated for by the blow applied by the other hammer.

In the herein exemplified case, the hammers are three, of pneumatic type, and with axes at 120° to each other, and are capable of reaching beating frequencies of up to 1000 blows per minute. The blowing frequency can be adjusted at the desired value by acting on a valve 53. The blow applied with respect to the shaft 30 by each pneumatic hammer 43 is compensated for by the blow applied by the other two hammers, with damages to the bearing 31 and 32 being thus avoided; however, the struck shaft 30 vibrates, causing the material which possibly overcharges it, to get detached. The pneumatic hammers are constrained to a triangular support structure 44 which comprises trueing rings 45, and all of them are fed simultaneously to one single pneumatic duct 46.

The considerable volume of noise generated by the pneumatic hammers 43 is deadened by a case 54 provided with an internal lining 55 of soundproofing material.

The means for discharging the material 7 comprise an opening 47 placed in correspondente of the second head 10, a sliding coupling flange 48, and a duct 49 which branches into two ducts in correspondence of a switching gate 50.

The two ducts arising from the branching of the duct 49 respectively end over a first conveyor tape 51 and a second conveyor tape 52. The switching gate 50 makes it possible for the exiting stream of material (litharge) to be addressed as a function of the quality level, i.e., of the purity level reached by the same litharge.

The means for feeding the oxidating air 8 comprise a pressure regulator 57 provided with a pressure gauge, installed downstream an electrovalve 58, and a rotameter 59 for controlling the flow rate of injected oxidating air stream.

The oxidating air is drawn from the external environment and is injected at the flexible coupling 26. Metering the amount of oxidating air flowing through the kiln is essential in order to prevent the formation of two substances which might pollute produced litharge, and namely: minium ($Pb_3O_4$) which is formed in the presence of an air excess, and metal lead (Pb), which is formed in case of air shortage. In particular cases, instead of environmental air suitable gas mixtures can be used.

The means 56 for controlling the depressure inside the kiln are substantially complementary to the means 8 for feeding the oxidating air.

The means 56 comprise a suction pipe 60, a servocontrolled valve 61 for regulating the intake, an instrument for checking the depressure inside the kiln 62 and the relevant sensor 63.

The suction pipe 60, which is installed at the end of the kiln 1 close to the second head 10, has a first, horizontal stretch branching from kiln side, and a second, vertical stretch.

In such a way, any minium formed, which precipitates owing to the cooling undergone by the dusts and the gases flowing along the pipe 60 cannot pollute the material, by now transformed into litharge, contained inside the kiln 1, but is collected inside a chamber 64 provided at the bottom end of the vertical stretch of the same suction pipe 60.

The servocontrolled valve 61 and the relevant sensor 63 maintain constantly inside the kiln 1 a preset depressure of very low value.

In fact, as it occurs for all of the apparatus handling such noxious substances as lead oxides, also these kilns are kept with an internal depressure in order to prevent such oxides from diffusing through the working premises.

However, it is necessary that the value of depressure is kept as low as possible, compatibly with the functional requirements of the kiln, in order to prevent the undesired and uncontrolled entering of oxidating air, which would alter the chemical reaction which governs the transformation of massicot into litharge, originating undesired byproducts, such as, e.g., minium.

The means 65 for weighing the kiln comprise a structure for supporting the kiln 66, which rests on load cells 67 suitable for detecting the weight loading the support structure 66, with the flexible coupling 26 and the sliding flange 48 being purposely provided.

The values of kiln weight are processed by an electronic control instrument (not shown in the figures) which supplies an alarm signal in case the weight of the kiln 1 exceeds certain preset values.

The electronic control instrument can be possibly given such a structure, as to also receive the values supplied by load cells 29 and consequently adjust the revolution speed of the metering screw feeder 24 and hence the flow rate of material charged to the kiln as a function of the flow rate of material discharged through the duct 49. Furthermore, in case the current absorbed by the motor 35 is monitored, by means of the electronic system also the control can be performed of the revolution speed of the screw conveyor means 6.

The electrical kiln 1 disclosed herein is particularly suitable for producing litharge by means of the calcination of massicot; however, the kiln 1 makes it possible also other substances, even if corrosive, to be submitted to the action of heat up to a maximum temperature of 750° C. and for a variable time as a function of the requirements of the process, under a controlled atmosphere, i.e., an oxidating or a reducing atmosphere, or an inert atmosphere, so as to cause suitable chemical transformation to take place in the material.

The product to be processed is stored in the feed hopper 28 from which the metering screw feeder 24 draws it as a function of the preset flowrate parameters.

The raw product enters the kiln at the first head 9, through the flexible coupling 26.

The paddles 36 of the shaft 30 push the material through the tubular body 2, inside which the material is heated up to such a temperature as to start the chemical reaction of calcination. Oxidating air supplies the necessary $O_2$ for free Pb contained in massicot to be oxidated to yield PbO.

The critical aspect of this process is represented by the cooling of produced litharge when the temperature thereof must decrease, starting from the temperature at which the calcination took place, to reach the room temperature, at which litharge can be regarded as stable.

Such a cooling should be as fast as possible, because the cooling curve of the material passes inside a certain temperature range (the critic range), within which litharge is converted into minium, which is a pollutant of litharge. The amount of polluting minium formed during the cooling step is substantially proportional to the stay time of litharge inside the critic range.

In the electrical kiln according to the present invention, this particular aspect was kept into particular consideration, with the heating power of the kiln being increased at the discharge region, and the number of paddles 36 being doubled in the region close to the product outlet, so that, with the revolution speed of the shaft 30 with paddles being the same, in such a region a faster and more efficacious removal of the product from the end portion of the kiln is achieved and the product is ultimately evacuated. In fact, such a region is the most critic one as to the formation of minium, and causes the greatest difficulties in the control of transformation parameters.

The differentiation of the heating power in the various regions of the kiln is obtained by varying the number of turns of the coil 11, so as to subdivide it into the elements 11A, 11B and 11C, acting with different heating powers on the respective tubular sections 13A, 13B and 13C which constitute the tubular body 13. In such a way, it is however possible to precisely establish in the kiln a prefixed constant temperature, with overheated regions (usually, the central regions) and colder regions (usually, the regions of the heads 9 and 10) being thus eliminated. In particular, also the regions close to the first head 9 and to the second head 10, tendentially colder respectively owing to the product charging and the presence of the discharge duct 49, and furthermore to the heat dispersions due to the heads 9 and 10, can anyway reach temperatures which are very close to the optimum temperature, which exists in the central region. The result is a better exploitation of the useful volume of the kiln and the control of those negative phenomena which may lead to a worsening of product quality.

The advantages shown by the kiln according to the invention are the following:

(a) The kiln is active along its whole length, and this feature made it possible its dimensions to be substantially reduced to those of just one of the tubes which compose the kilns of traditional type.

(b) The heating by means of the electromagnetic induction effect makes it possible an excellent evenness of heating of the material to be reached, together with the possibility of establishing with considerably high precision and reliability the temperature of the material in any points of the kiln, also in case should such a result require very considerable amounts of energy to be fed along the length of the kiln.

(c) Any possible adjustments of the amount of energy fed in order to heat the kiln can be carried out very quickly.

(d) Heat dispersions are very limited, and such as not to have a negative influence of the steady-state temperature.

(e) The maintenance costs are considerably reduced, because a decrease is observed in the chemical and thermal stresses applied to the external wall of the tubes not lapped any longer by the particularly corrosive flue gases generated by the combustion; furthermore, the absence of free flames renders useless the presence of refractory brick linings, which, in the kilns known from the prior art, are subject to continuous checks and rebuilding operations.

(f) A possible perforation of the tube only results in the product contained in it falling down onto the underlying floor, without any dispersions of highly polluting products due to their lead basis in the surrounding atmosphere taking place.

(g) Thanks to the ease of a precise, continuous and reliable monitoring of the thermal-chemical quantities on whose basis the means for automatically regulating and monitoring the kiln work, such means can be installed easily and profitably.

(h) An environmental pollution caused by the operation of the kiln does not practically exist, in particular thanks to the control of the depressure inside the interior of the kiln, which secures that the kiln will be constantly kept at the proper depressure value.

I claim:

1. A kiln for producing litharge by means of calcination of massicot or raw material in powder form advancing inside its interior which comprises screw feeder means having one single tubular body containing raw material, said tubular body having a major axis, a first head, and a second head, means for feeding raw material to the kiln installed at the first head, an electromagnetic induction heating unit along said tubular body wherein said electromagnetic induction heating unit is externally coaxial with the tubular body and comprises, starting from an external surface of said tubular body, a tube of ferromagnetic material, at least one layer of insulting refractory material and an induction coil and between the tubular body and the tube of ferromagnetic material an air space is provided, inside which an inert gas is contained, means for feeding oxidating air, and means for discharging the material from the kiln.

2. A kiln according to claim 1, wherein
   (a) said induction coil is divided into a plurality of elements of variable inductive power; and
   (b) said tube of ferromagnetic material, is divided into a plurality of sections which corresponds to the plurality of elements of said induction coil, each section of said tube of ferromagnetic material being linked to an adjacent section by means of joints which ensure a thermal magnetic continuity of said tube of ferromagnetic material.

3. A kiln according to claim 1, wherein the tubular body is made from stainless steel and the inert gas in nitrogen.

4. A kiln according to claim 1, wherein the layer of insulating refractory material comprises, starting from an external surface of said insulating refractory material, spacer beam on which turns of the induction coil rest, a coating of fiberglass reinforced polyester resin, a plurality of layers of fiber glass cloth filled with titanium and zirconium oxides, a wrapping with a fiberglass or asbestos ribbon, a plurality of layers of ceramic fiber.

5. A kiln according to claim 1, wherein the screw feeder means for translating the raw material inside the kiln comprise a shaft with paddles driven by a motor and a relevant chain transmission, installed at a first end of said shaft, with the paddles provided on said shaft being arranged to form a simple screw in a region close to the first head and in an intermediate region between the first head and the second head, and to form a double screw in a region close to the second head.

6. A kiln according to claim 5, wherein the shaft with paddles is supported at its ends by a first bearing and a second bearing, said first bearing and second bearing are shifted perpendicularly to the major axis of the kiln by means of an oblique shift.

7. A kiln according to claim 1, wherein said means of feeding the oxidating air comprising a pressure regulator equipped with a pressure gauge and installed downstream from an electrovalve, a rotameter for controlling the flow rate of oxidating air feed, with said oxidating air being injected into the kiln at the first head.

8. A kiln according to claim 1, wherein the means for discharging the material comprise an opening provided at the second head, a sliding coupling flange, and a discharge duct which branches into two ducts in correspondence of a switching gate.

9. A kiln according to claim 7, wherein the means for feeding the oxidating air operate associated with means for controlling a depressure inside the kiln, said means for controlling a depressure comprising a suction pipe, a servo-controlled valve, an instrument for detecting the depressure inside the kiln, and a relevant sensor.

10. A kiln according to claim 9, wherein said suction pipe has a first, horizontal stretch branching from a side of the kiln, and a second, vertical stretch is equipped at its bottom with a chamber for collecting settled dusts.

11. A kiln for producing litharge by mean of calcination of massicot or raw material in powder form advancing inside said kiln, which comprises;
   (a) screw feeder means having (i) one single tubular body containing a raw material, said tubular body having a major axis, a first head, and a second head,
(ii) a shaft with paddles driven by a motor having beating means, said beating means comprise a plurality of hammers, wherein a blow applied by each hammer with respect to said shaft is compensated by a blow applied by the other hammer,
(b) means for feeding raw material to said kiln installed at the first head;
(c) an electromagnetic induction heating unit along the tubular body;
(d) means for feeding oxidating air; and
(e) means for discharging the material from the kiln.

12. A kiln according to claim 11, the beating means comprise three pneumatic hammers acting along axes arranged at 120° relatively to one another.

13. A kiln according to claim 12, wherein the beating means are enclosed inside a soundproofed case.

14. A kiln according to claim 11, the means for feeding the raw material to the kiln comprise a metering screw feeder driven by a relevant ration motor, a feed hopper, a support structure for said feed hopper with load cells being installed between said support structure and said feed hopper for detecting a change in hopper weight.

15. A kiln according to claim 11, further comprising means for weighing which comprise a support structure which supports the kiln and rests on a plurality of load cells suitable for detecting the weight of said kiln.

16. A kiln according to claim 11, wherein said motor monitors absorbed current value with respect to a seizure of said screw feeder means, said absorbed current value being taken as an index of risk of seizure of said screw feeder means inside the kiln.

17. A kiln according to one of claims 14, 15, or 16, wherein said load cells associated with said feed hopper is suitable for detecting the weight of the kiln, said load cells and said motor are connected to one single electronic system for controlling the raw material feed to the kiln.

* * * * *